UNITED STATES PATENT OFFICE.

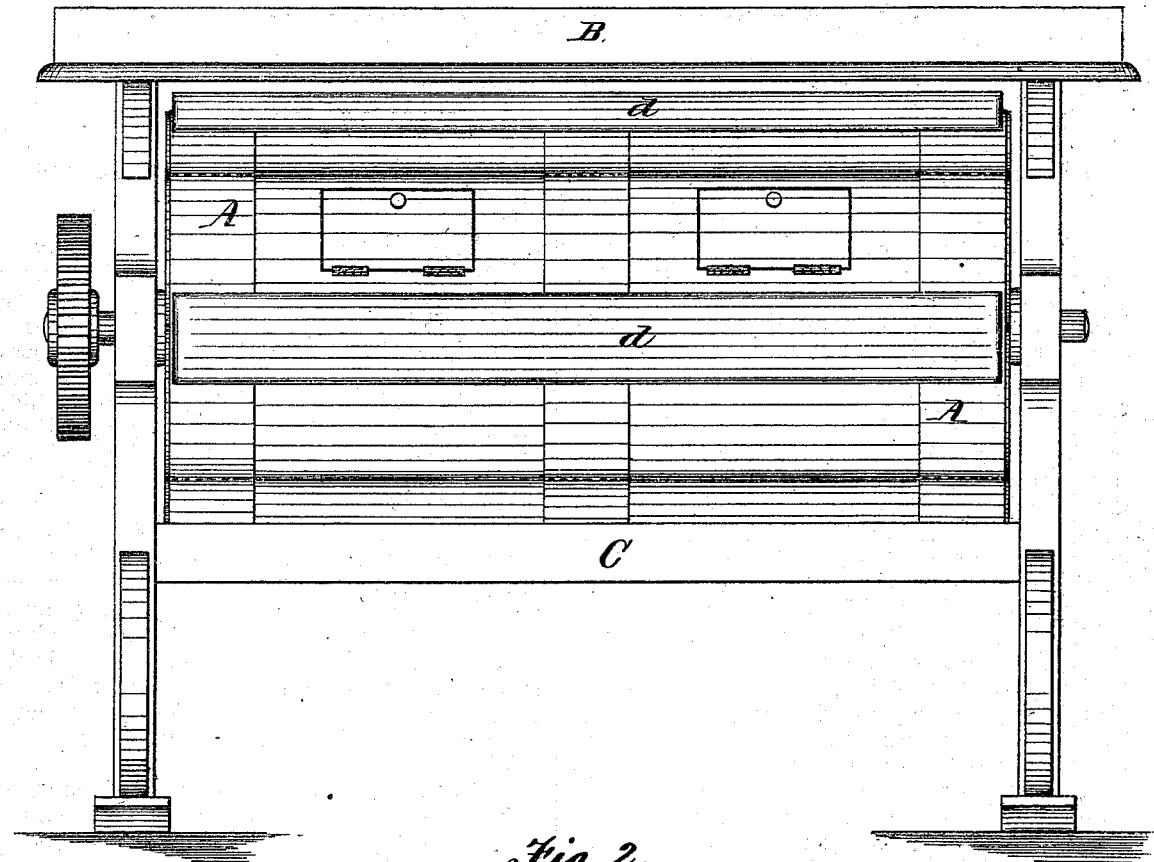
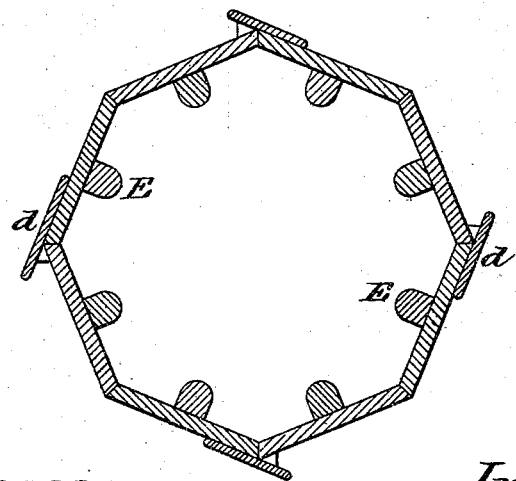

RILEY P. WILSON, OF NEW YORK, N. Y.

IMPROVEMENT IN TANNING HIDES.

Specification forming part of Letters Patent No. 120,606, dated November 7, 1871; antedated October 21, 1871.

*To all whom it may concern:*

Be it known that I, RILEY P. WILSON, of the city, county, and State of New York, have invented certain Improvements in Tanning Hides, of which the following is a specification:

The first part of my invention consists of a cylinder with corrugations $e\ e$, attached to the concave surface, projecting sufficiently to carry up the hides from one to three feet, when they fall upon corresponding arms, giving a kneading action upon the hides while being depilated, colored, or tanned, Figure I, A. The second part of my invention consists of methods to regulate the temperature of the hides while undergoing the process of depilation, coloring, and tanning. Immediately above the cylinder I place a box or reservoir, B, for water, which I use, as occasion may require, in jets upon the cylinder, thereby regulating the temperature of the cylinder and its contents, as occasion may require. A receiver or reservoir for water may be placed directly under the cylinder C, while upon the cylinder buckets may be attached, $d\ d$, to carry up the water and thus saturate the same. By this means a small quantity of water will answer, with the addition of some ice. This lower box will be very convenient to receive the hides after being tanned or depilated. For depilating, I use the following composition: To one hundred gallons of water I use three gallons of lime, two ounces of potassium, two quarts of strong soft soap, two ounces of ammonia, three ounces of sulphur. This composition will start hair in two days. After drenching, I use the following composition for coloring: Five to seven degrees of strength in a liquor formed of bark extract, catechu, sumac, salt, and one ounce of ammonia. After revolving for two or three hours the hides are drained and placed in the tanning-cylinder with a composition prepared as follows: I take bark extract and make a liquor of twenty degrees strength, adding sumac, one part, cutch, one part, until the strength is raised to twenty-eight degrees. I then add six pounds of rye flour or barley, four pounds of pulverized alum, one pound of ammonia, five pounds ground mustard seed, twelve pounds salt, one pound sulphuric acid, and six pounds brown sugar. I tan in this liquor calf and goat-skins from ten to fourteen hours, kip twenty hours, heavy uppers two days, and sole-leather from six to twelve days.

What I claim is—

1. A cylinder, as above described, in combination with buckets and water-box, or a fountain supplied with jets, for the purpose described.

2. The above compositions for depilating, coloring, and tanning, as above set forth, and for the purposes specified.

RILEY P. WILSON.

Witnesses:
 ODELL WILSON,
 B. CRANE. (92)